United States Patent Office 3,400,142
Patented Sept. 3, 1968

3,400,142
PREPARATION OF EQUILIBRATED TETRAALKYL LEAD MIXTURES
Shinichi Imura and Yoshikazu Tamai, Tokyo, Japan, assignors to Echiru Kagaku Kogyo Kabushiki Kaisha, Tokyo, Japan, a corporation of Japan
No Drawing. Filed Feb. 1, 1965, Ser. No. 429,670
Claims priority, application Japan, Feb. 11, 1964, 39/6,866; Dec. 29, 1964, 39/74,328
3 Claims. (Cl. 260—437)

ABSTRACT OF THE DISCLOSURE

A process for preparing equilibrated tetraalkyl lead mixtures by redistribution of alkyl radicals which comprises affecting such redistribution in the presence of a trialkyl lead salt of a cation exchange resin, represented by the formula RE—SO$_3$H, wherein RE represents the resin portion.

---

This invention relates to equilibrated tetraalkyl lead mixtures which are useful as antiknock agents for automotive and aviation gasoline. More particularly, it relates to a method of preparing equilibrated tetraalkyl lead mixtures consisting of tetramethyl lead, trimethyl monoethyl lead, dimethyl diethyl lead, monomethyl triethyl lead and tetraethyl lead, from tetraalkyl lead mixtures by means of a redistribution reaction of alkyl radicals in the presence of a catalyst. The invention also relates to the catalyst to be used in said process.

As methods for preparing equilibrated tetraalkyl lead mixtures from alkyl lead mixtures, e.g., a mixture of tetramethyl lead and tetraethyl lead, by means of the redistribution reaction of alkyl radicals, known are the method which uses as catalyst the Lewis acids such as AlCl$_3$, FeCl$_3$, etc. (U.S. Patent 2,270,108) and the method which uses as catalyst trifluoroboron etherate (U.S. Patent 3,151,141). However, the method using as catalyst the Lewis acids has numerous shortcomings. Take, for example, the use of AlCl$_3$. In this case, due to the fact that it readily reacts with the moisture in the air, its handling as well as the maintenance of its activity is not easy. In addition, it is impossible to recover and reuse it. Further, since its reaction with the tetraalkyl leads is so violent, not only danger is involved but corrosion of the equipment cannot be avoided, hence making it impossible to adopt a continuous reaction process. Further, there is required post treatments such as decomposition and elimination of the AlCl$_3$ remaining in the reaction product. On the other hand, the method in which trifluoroboron etherate is used as the catalyst also has its drawback in that there is the need for decomposing and eliminating the catalyst remaining in the reaction product.

An object of the present invention is to provide a process for preparing equilibrated tetraalkyl lead mixtures in which these drawbacks do not exist.

A further object of the invention is to provide a catalyst which can be used for attaining the foregoing objective.

Other objects of this invention will be obvious from the contents of the specification hereinafter disclosed.

As a result of having engaged in extensive researches for attaining the foregoing objectives, we found that a trialkyl lead salt of a cation exchange resin, which was obtained by subjecting a cation exchange resin, in the presence of a solvent, to the action of at least one lead compound of the formula R$_3$PbX, wherein R is an alkyl radical selected from the group consisting of methyl and ethyl, the three R's not necessarily being required to be the same radical, and X is a radical selected from the group consisting of methyl, ethyl hydroxyl, organic acid radicals and halogen, was very effectively used as catalyst in the aforementioned redistribution reaction of alkyl radicals.

Letting RE—SO$_3$H, wherein RE denotes a resin, stand for the cation exchange resin, then the reaction for forming the trialkyl lead salt of a cation exchange resin

wherein RE and R are as hereinabove defined, can be generally expressed by the following Equation 1, wherein RE, R and X are as hereinbefore indicated.

(1)  RE—SO$_3$H+R$_3$PbX→RE—SO$_3$PbR$_3$+H—X

This reaction will be fully described hereinafter with respect to each class of the lead compounds R$_3$PbX used.

When a lead compound of the formula R$_3$PbX wherein R and X are both alkyl, for example, tetraethyl lead, is used as the starting material, the reaction is preferably carried out by adding the tetraethyl lead and a solvent such as toluene, ethylene dichloride, ethyl alcohol, etc., to the cation exchange resin and thereafter stirring the mixture at 30–90° C. The reaction proceeds as in the following Equation 2 when, say, tetraethyl lead has been used, and the intended trialkyl lead salt of a cation exchange resin is obtained.

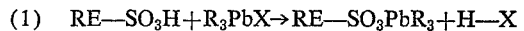

Instead of tetraethyl lead, either tetramethyl lead or a mixture of tetraethyl and tetramethyl lead in an optional proportion may also be used. Further, a similar catalyst is obtained by using the equilibrated tetraalkyl lead mixtures. When tetramethyl lead has been used alone, a trimethyl lead salt of a cation exchange resin is obtained, whereas when either a mixture of tetramethyl and tetraethyl lead or an equilibrated tetraalkyl lead mixture has been used, a trialkyl lead salt of a cation exchange resin is obtained.

When a lead compound of the formula R$_3$PbX, in which the X is a hydroxyl radical, i.e., a trialkyl lead hydroxide, is used as the starting material, the trialkyl lead salt of a cation exchange resin can normally be obtained readily by adding at room temperature a suitable amount of an aqueous solution of the trialkyl lead hydroxide to the cation exchange resin impregnated with water. The reaction proceeds in accordance with the following Equation 3:

(3)  RE—SO$_3$H+R$_3$PbOH→RE—SO$_3$PbR$_3$+H—OH

When using as the starting material a compound of the formula R$_3$PbX, wherein X is an organic acid radical or halogen, i.e., a trialkyl lead salt of an organic acid or a hydrogen halide, a reaction procedure such as described below is to be preferred.

For example, when using the triethyl lead salt of mono chloroacetic acid, by packing a column with a cation exchange resin which has been impregnated with water and then causing a 5% solution of the lead compound in a water-alcohol mixture (1:4 by volume) to flow at a suitable rate down through said column at room temperature, the equilibrium shown in Equation 4 shifts to the right side to yield the intended triethyl lead salt of a cation exchange resin.

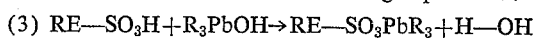

The freed chloroacetic acid becomes dissolved in the water-alcohol mixture and flows out.

On the other hand, when triethyl lead chloride is used, its about 2% aqueous alcohol solution is passed through a strong basic OH-type anion exchange resin to convert the triethyl lead chloride first to triethyl lead hydroxide, following which this is flowed through a column packed with a cation exchange resin to form the intended triethyl lead salt. Instead of using a double bed reaction method as in this case, a mixed bed reaction method can also be employed, which comprises blending together the strong basic OH-type anion exchange resin and the strong acidic H-type cation exchange resin and using this mixture packed in the column. In the case of the double bed and the mixed bed, reaction methods are shown by means of Equation 5.

(5) $RE{\equiv}NOH + R_3PbCl \rightleftarrows RE{\equiv}NCl + R_3PbOH$
$R_3PbOH + RE{-}SO_3H \rightarrow RE{-}SO_3PbR_3 + H{-}OH$ The trialkyl lead salt of a cation exchange resin obtained by the invention method contains, based on the total acid radicals, 30–99% of trialkyl lead salts, and 70–1% of dialkyl lead salts, inorganic lead salts and free acid radicals. The product obtained by means of Equation 2 is stored or used as catalyst in its as-obtained state or after washing with toluene. The products obtained by means of Equations 3, 4 and 5 are, on the other hand, either stored as obtained or stored or used as a catalyst after first being washed with either methyl or ethyl alcohol, then toluene, in the order given.

The H-type cation exchange resin used in practicing the invention method may be either the one having a sulfonic acid radical ($-SO_3H$) or the one having a carboxylic acid radical ($-COOH$) in it molecules. Preferred however is the strong acidic cation exchange resin having the sulfonic acid radical, particularly the strong acidic H-type cation exchange resin for a nonaqueous solution. The usual strong acidic H-type cation exchange resin for an aqueous solution may also be used, however. On the other hand, as the anion exchange resin used in the case of Equation 5, suitably used is the strong basic OH-type anion exchange resin having a quaternary ammonium radical ($\equiv N-OH$) in its molecules. The strong acidic H-type cation exchange resin is preferably one which is porous and resistant to heat and organic solvents and having a shape whose surface area per unit weight is great such as in the case where it is spheroidal in shape or in crushed amorphous lumps. Particularly, in the method according to Equation 2 where water is not used as a solvent, it is preferred that, as the starting material, use be made of the strong acidic H-type cation exchange resin, which, besides possessing the foregoing properties, has its water content adjusted to 0.1–1.0% by weight and which has been stored either by being immersed in a solvent such as toluene or kerosene, or in an almost completely dried state.

While the tetramethyl or tetraethyl lead used in the method of Equation 2 is preferably one having a purity of 95–99% by weight, it may contain a solvent such as toluene, kerosene, ethylene dichloride, ethylene dibromide, ethyl alcohol and tetrahydrofuran. Further, there is no objection from the practical standpoint of using as the starting material either a mixture of tetramethyl and tetraethyl lead or an equilibrated tetraalkyl lead mixture.

The trialkyl lead hydroxide used in the method of Equation 3 is readily obtained as an aqueous solution either by subjecting a trialkyl lead chloride in an aqueous solution to the action of $Ag_2O$ or by treating with a strong basic OH-type anion exchange resin a trialkyl lead salt of a hydrogen halide or organic acid, which is soluble in water or a water-ethyl alcohol mixture.

The trialkyl lead salt of an organic acid or hydrochloric acid, which can be used in the methods of Equations 4 and 5, are exemplified by such as trialkyl lead chloride, trialkyl lead acetate, trialkyl lead monochloroacetate, trialkyl lead dichloroacetate, trialkyl lead fluoroacetate, trialkyl lead benzoate, trialkyl lead benzenesulfonate and trialkyl lead toluenesulfonate. These compounds can all be prepared by known methods. Suitable used as the solvent in the methods of Equations 4 and 5 are water, ethyl or methyl alcohol, and the mixtures thereof.

Since according to the foregoing methods the reaction for forming the trialkyl lead salts of cation exchange resins is carried out under a state wherein the starting materials are diluted with solvents, the chemically instable organic lead compounds can be handled stably. In addition, there is the merit that no special equipment is required for carrying out the reactions. In the case of the reaction according to Equation 2, the chief apparatus is a reaction vessel equipped with an agitating means, while in the reactions according to Equations 3, 4 and 5 a column is employed, no other special equipment being required in either case.

The course through which the reaction proceeds for preparing the equilibrated tetraalkyl lead mixtures, using as catalyst the trialkyl lead salts of cation exchange resins, prepared as hereinbefore described, is complicated, a part of the main reaction being as shown by the following equations, wherein $RE-SO_3$ represents the nucleus of the strong acidic cation exchange resin, and R' and R'' methyl and ethyl, respectively.

$RE-SO_3PbR'_3 + R''_4Pb \rightleftarrows RE-SO_3PbR''_3 + R''PbR'_3$
$RE-SO_3PbR''_3 + R'_4Pb \rightleftarrows RE-SO_3PbR'_3 + R''_3PbR'$
$RE-SO_3PbR'_3 + R''_3PbR' \rightleftarrows$
$\qquad RE-SO_3PbR''_2R' + R''PbR'_3$
$RE-SO_3PbR''_3 + R''PbR'_3 \rightleftarrows$
$\qquad RE-SO_3PbR''R'_2 + R''_3PbR'$
$RE-SO_3PbR''_2R' + R''PbR'_3 \rightleftarrows$
$\qquad RE-SO_3PbR''R'_2 + R''_2PbR'_2$
$RE-SO_3PbR''R'_2 + R''_3PbR' \rightleftarrows$
$\qquad RE-SO_3PbR''_2R' + R''_2PbR'_2$ The tetraalkyl lead mixtures to be used as starting materials in the redistribution reaction of alkyl radicals of the invention method include the mixture of tetramethyl and tetraethyl lead, the tetraalkyl leads having both the methyl and ethyl radicals in their molecules, and the mixtures thereof. The ratio of methyl and ethyl radicals in these tetraalkyl leads is preferably one which is about the same as the ratio between the methyl and ethyl radicals in the intended equilibrated tetraalkyl lead mixture. Normally, it is preferred that the tetramethyl lead be one with a purity of 95–99% by weight and the tetraethyl lead with a purity of 97–99% by weight, though they may contain a solvent such as toluene, kerosene, ethylene dichloride and ethylene dibromide.

In practicing the redistribution reaction of alkyl radicals according to the invention method, it is an advantage to prepare the tetraalkyl lead compounds, such as mentioned above, into a suitable mixture and then pass this mixture continuously through a reaction column packed with the catalyst, at a temperature of 10–110° C., and preferably 30–70° C. As the reaction column, a single or multistage column equipped with a jacket for heating by means of a hot medium such as steam or water is preferred. Further, it is also possible to carry out the reaction by the batch method, i.e., by heating with stirring a mixture of a trialkyl lead salt of a cation exchange resin and one or more tetraalkyl leads, in a reaction vessel. In this case, the reaction product can be readily separated simply by filtration or decantation, and the residual trialkyl lead salt of a cation exchange resin can be reused in the reaction which follows.

As compared with the prior art methods of preparing equilibrated tetraalkyl lead mixtures, in accordance with the redistribution reaction of alkyl radicals of the invention method, the handling and management of the catalyst is easy, the life of the catalyst is semipermanent, and the intended equilibrated tetraalkyl lead mixture can be obtained quantitatively. In addition, the invention method has the following merits: namely, that its features are well manifested in the continuous process, that its safety during the reaction is superior, that noncorrosiveness of the equipments need not be considered, and that no post-treatment step of the reaction product is required, as contrasted with the prior art methods.

For a clearer understanding of the invention, the following nonlimitative examples are given. The measurement of the composition of the equilibrated tetraalkyl lead mixtures obtained in the several examples was by means of gas chromatography. Unless otherwise indicated, all parts and percentages are on a weight basis.

Example 1

When 8.5 parts of a toluene-impregnated strong acidic cation exchange resin for nonaqueous solution, 60 parts of tetramethyl lead and 72 parts of tetraethyl lead are reacted at 60° C. with stirring, a trialkyl lead salt of the cation exchange resin is formed with evolution of methane and ethane. The redistribution reaction of alkyl radicals is completed in 3 hours by means of the action of this resin catalyst. The trialkyl lead salt of the cation exchange resin is separated by filtration from the reaction product and 127 parts of an equilibrated tetraalkyl lead mixture are obtained. This equilibrated tetraalkyl lead mixture is composed of 5.0% tetramethyl lead, 24.2% trimethyl monoethyl lead, 38.1% dimethyl diethyl lead, 25.9% monomethyl triethyl lead, 5.2% tetraethyl lead and 1.6% toluene.

Example 2

8.5 parts of the trialkyl lead salt of a cation exchange resin formed in accordance with Example 1 is separated from the reaction system. When this is added to 60 parts of tetramethyl lead and 72 parts of tetraethyl lead and reacted at 60° C. with stirring, the redistribution reaction of alkyl radicals is completed in 3 hours. By separating the trialkyl lead salt of a cation exchange resin from the reaction product by means of filtration, 131 parts of an equilibrated tetraalkyl lead mixture are obtained. This equilibrated tetraalkyl lead mixture is composed of 5.2% tetramethyl lead, 24.6% trimethyl monoethyl lead, 38.7% dimethyl diethyl lead, 26.4% monomethyl triethyl lead and 5.1% tetraethyl lead.

Example 3

To 5 parts of a strong acidic H-type cation exchange resin adjusted to a water content of not more than 1% are added 5 parts of toluene and 20 parts of tetraethyl lead, following which the mixture is reacted for 1 hour at 60° C. with stirring, and thereafter the triethyl lead salt of the foregoing resin is obtained by filtration.

When 10 parts of the so obtained catalyst are packed in a column and an equimolar mixture of tetramethyl and tetraethyl lead is caused to flow down through the column at the rate of 30 parts per hour at 60° C., an equilibrated tetraalkyl lead mixture having substantially the same composition as that of the mixture of Example 2 is obtained. In this case, even though 5000 parts of the equimolar mixture of tetramethyl and tetraethyl lead are flowed down, the catalytic activity does not decline.

Further, the catalyst obtained by reacting under substantially similar conditions tetramethyl lead instead of the aforementioned tetraethyl lead also yielded the same results as the catalyst obtained by using tetraethyl lead as the starting material.

Example 4

When the procedures described in Example 3 were followed, except that 5 parts of ethylene dichloride were used instead of the toluene, the intended product was obtained in 40 minutes. The catalytic activity of this product was the same as that of the product obtained in Example 3.

Example 5

70 parts of an aqueous 3% triethyl lead hydroxide solution are added to 1 part of a strong acidic H-type cation exchange resin. After stirring for 10 minutes, the triethyl lead salt of the foregoing resin is separated by filtration.

In using this product as catalyst in conducting the reaction for forming an equilibrated tetraalkyl lead mixture, it is packed in a column and before using it for carrying out the reaction, it is washed in advance with a suitable amount of ethyl alcohol and then toluene. When 10 parts of this catalyst are packed in the column and an equimolar mixture of tetramethyl and tetraethyl lead is caused to flow down through the column at the rate of 60–70 parts per hour at 60° C., an equilibrated tetraalkyl lead mixture having a composition about the same as that of the product of Example 2 is obtained.

Similar results were also obtained when a mixture of trimethyl lead hydroxide, dimethyl monoethyl lead hydroxide and monomethyl diethyl lead hydroxide is reacted by a similar method as hereinabove described.

Example 6

A 5% solution of triethyl lead monochloroacetate is prepared by dissolving it in a mixture of 8 parts of alcohol and 2 parts of water. By flowing this solution down through a column packed with 10 parts of a strong acidic cation exchange resin over a period of 10 hours at the rate of 100 parts per hour, a triethyl lead salt of the foregoing resin is obtained.

Before using this product as catalyst in the reaction for forming an equilibrated tetraalkyl lead mixture, it is given a washing treatment with ethyl alcohol and toluene, as in Example 5. The reaction is then carried out under identical conditions as in said example, using this catalyst. The resulting equilibrated tetraalkyl lead mixture has a composition about the same as that of the product of Example 2.

Example 7

A double bed is constructed by connecting to the outflow side of a column packed with 5 parts of a strong basic OH-type anion exchange resin, a column packed with 1 part of a strong acidic H-type cation exchange resin. A 2% solution of triethyl lead chloride is prepared by dissolving it in a mixture of an equal volume of alcohol and water. When 300 parts of this solution are passed through the foregoing columns over a period of 15 hours, the triethyl lead chloride is converted to triethyl lead hydroxide by means of the strong basic OH-type anion exchange resin, after which this triethyl lead hydroxide reacts with the strong acidic H-type cation exchange resin to form the intended triethyl lead salt of the resin.

In advance of the use of this product as catalyst for the reaction for forming an equilibrated tetraalkyl lead mixture, it is given a washing treatment as in Example 5. This catalyst is then used and the reaction is carried out under identical conditions as in said example. The resulting equilibrated tetraalkyl lead mixture has a composition about the same as that of the product of Example 2.

Example 8

A 5% solution of triethyl lead monochloroacetate is prepared by dissolving it in a mixture consisting of 1 part of water and 4 parts of alcohol. By flowing this solution down through a column under identical conditions as in Example 7, results similar to that of said example are obtained. This catalyst is used and the reaction is conducted under identical conditions as in Example 5. The so obtained equilibrated tetraalkyl lead mixture has a composition substantially similar to that of the mixture obtained in Example 2.

Example 9

A mixed bed is constructed by packing a column with a mixture of 3 parts of a strong basic OH-type anion exchange resin and 1 part of a strong H-type cation exchange resin. 300 parts of a 2% solution of triethyl lead chloride in a mixture of an equal volume of alcohol and water are flowed down through this column over a period of 15 hours, after which water is introduced countercurrently from the bottom of the column for eliminating the hydrochloride salt of the strong basic anion exchange resin by causing the salt to overflow. The remaining trialkyl lead salt of a strong acidic cation exchange resin is first washed with methyl alcohol and then with toluene. This catalyst is used and the reaction is carried out under identical conditions as in Example 5. The resulting equilibrated tetraalkyl lead mixture has a composition substantially similar to that of the mixture obtained in Example 2.

Example 10

When 8.5 parts of the triethyl lead salt of a cation exchange resin obtained in Example 5, 31.5 parts of tetramethyl lead and 110.3 parts of tetraethyl lead are reacted at 60° C. with stirring, the redistribution reaction of alkyl radicals is completed in 1.5 hours. The trialkyl lead salt of a cation exchange resin is separated from the reaction product by means of filtration, and 136 parts of an equilibrated tetraalkyl lead mixture are obtained. This equilibrated tetraalkyl lead mixture has a composition of 0.3% tetramethyl lead, 4.1% trimethylmonoethyl lead, 20.3% dimethyl diethyl lead, 41.9% monomethyl triethyl lead and 33.7% tetraethyl lead.

Example 11

When 75 parts of tetraethyl lead are added to 8.5 parts of a toluene-impregnated strong acidic exchange resin for nonaqueous solution and reacted at 60° C. with stirring, a triethyl lead salt of a cation exchange resin is formed in 30 minutes with evolution of ethane. Then, by adding further 60 parts of tetramethyl lead and continuing the reaction at 60° C. with stirring, the redistribution reaction of alkyl radicals is completed in 3 hours. By filtering off the trialkyl lead salt of a cation exchange resin from the reaction product, an equilibrated tetraalkyl lead mixture is obtained. This equilibrated tetraalkyl lead mixture has a composition substantially identical to that of the mixture obtained in Example 2.

Example 12

When 61 parts of tetramethyl lead are added to 8.5 parts of a toluene-impregnated strong acidic cation exchange resin for nonaqueous solution and reacted at 60° C. with stirring, a trimethyl lead salt of the cation exchange resin is formed in 30 minutes with evolution of methane. Then when 72 parts of tetraethyl lead are added and the reaction continued at 60° C., the redistribution reaction of alkyl radicals is completed in 3 hours. 126 parts of an equilibrated tetraalkyl lead mixture are obtained from this reaction product by filtering off the trialkyl lead salt of the cation exchange resin. The composition of this mixture is substantially the same as that of the mixture obtained in Example 2.

Example 13

Adding 130 parts of dimethyl diethyl lead to 8.5 parts of the trialkyl lead salt of a cation exchange resin used in Example 5, the reaction is carried out, with stirring, for 1.5 hours at 60° C. The yield of the reaction product amounts to 129 parts and its composition is substantially identical to that of the product obtained in Example 2.

Example 14

55 parts of trimethylmonoethyl lead and 60.5 parts of monomethyl triethyl lead are added to 8.5 parts of the trialkyl lead salt of a cation exchange resin used in Example 13, and the reaction is carried out, with stirring, for 1.5 hours at 60° C. The yield of the reaction product is 115 parts, and its composition is substantially the same as that of the product of Example 2.

Example 15

When, instead of the strong acidic cation exchange resin for nonaqueous solution of Example 1, a strong acidic cation exchange resin for aqueous solution whose water content has been adjusted to about 0.5% is used, results obtained were identical to those obtained in Example 1.

We claim:
1. In a method of preparing equilibrated tetraalkyl lead mixtures by means of the redistribution reaction of the alkyl radicals of tetraalkyl lead mixtures, the improvement which comprises affecting said redistribution reaction of alkyl radicals in the presence of a trialkyl lead salt of a cation exchange resin, represented by the formula RE—$SO_3H$, wherein RE represents a resin as catalyst, said trialkyl lead salt of a cation exchange resin being that obtained by subjecting a cation exchange resin, in the presence of a solvent, to the action of at least one lead compound of the formula $R_3PbX$, wherein R is an alkyl selected from the group consisting of methyl and ethyl, it being not necessarily required that the three R's are all the same alkyl radical, and X is a radical selected from the group consisting of methyl, ethyl, hydroxyl, organic acid radicals and halogen.

2. In a method of preparing equilibrated tetraalkyl lead mixtures by means of the redistribution reaction of the alkyl radicals of tetraalkyl lead mixtures, the improvement which comprises effecting said redistribution reaction of alkyl radicals by passing a tetraalkyl lead mixture through a column packed with a trialkyl lead salt of a cation exchange resin as catalyst at a temperature ranging between 10° and 110° C., said trialkyl lead salt of a cation exchange resin represented by the formula RE—$SO_3H$, wherein RE represents a resin, being that obtained by subjecting a cation exchange resin, in the presence of a solvent, to the action of at least one lead compound of the formula $R_3PbX$, wherein R is an alkyl selected from the group consisting of methyl and ethyl, it being not necessarily required that the three R's are all the same alkyl radical, and X is a radical selected from the group consisting of methyl, ethyl, hydroxyl, organic acid radicals and halogen.

3. A method of preparing equilibrated tetraalkyl lead mixtures which comprises subjecting a cation exchange resin to the action of a mixture of tetramethyl and tetraethyl lead, at a temperature ranging between 30° and 90° C. in the presence of a solvent, to form first a trialkyl lead salt of the cation exchange resin, represented by the formula RE—$SO_3H$ wherein RE represents a resin, in the reaction system, and thereafter continuing to maintain the temperature of the reaction system in the range between 10° and 110° C. to set up a redistribution reaction of the alkyl radicals.

References Cited

UNITED STATES PATENTS

| | | | |
|---|---|---|---|
| 2,270,108 | 1/1942 | Calingaert et al. | 260—437 |
| 3,151,141 | 9/1964 | Arimoto | 260—437 |
| 3,151,142 | 9/1964 | Arimoto | 260—437 |
| 3,158,636 | 11/1964 | Wall | 260—437 |
| 3,231,510 | 1/1966 | Classon | 260—437 |

OTHER REFERENCES

Calingaert et al.: JACS, vol. 61 (1939) pp. 2750–2754.
Dub: Organometallic Compounds, Monsanto Chemical Co., vol. II (1961), pp. 302 and 303.

TOBIAS E. LEVOW, *Primary Examiner.*

H. M. S. SNEED, *Assistant Examiner.*